(12) United States Patent
Capurso et al.

(10) Patent No.: US 11,740,778 B2
(45) Date of Patent: *Aug. 29, 2023

(54) DETECTING A PRE-DEFINED ACCESSIBILITY PATTERN TO MODIFY THE USER INTERFACE OF A MOBILE DEVICE

(71) Applicant: Capital One Services, LLC, McLean, VA (US)

(72) Inventors: Nicholas Capurso, Tysons Corner, VA (US); Jason Pribble, McLean, VA (US); Daniel Alan Jarvis, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/496,255

(22) Filed: Oct. 7, 2021

(65) Prior Publication Data

US 2022/0027044 A1    Jan. 27, 2022

Related U.S. Application Data

(63) Continuation of application No. 16/544,211, filed on Aug. 19, 2019, now Pat. No. 11,175,809.

(51) Int. Cl.
*G06F 17/00* (2019.01)
*G06F 3/04845* (2022.01)
(Continued)

(52) U.S. Cl.
CPC .......... *G06F 3/04845* (2013.01); *G06F 3/011* (2013.01); *G06F 3/017* (2013.01);
(Continued)

(58) Field of Classification Search
CPC ...... G06F 3/04845; G06F 3/011; G06F 3/017; G06F 3/0482; G06F 2203/04803;
(Continued)

(56) References Cited

U.S. PATENT DOCUMENTS 7,644,367 B2   1/2010  McKeon et al.
8,233,613 B1   7/2012  Michaelis et al.
(Continued)

OTHER PUBLICATIONS

Peissner, 'MyUI: Generating Accessible User Interfaces from Multimodal Design Patterns', EICS'12, Jun. 25-26, 2012, ACM (Year: 2012).*

(Continued)

*Primary Examiner* — Stephen S Hong
*Assistant Examiner* — Matthew J Ludwig
(74) *Attorney, Agent, or Firm* — Sterne, Kessler, Goldstein & Fox P.L.L.C.

(57) ABSTRACT

Disclosed herein are various embodiments for detecting predefined accessibility patterns for modifying a user interface of a mobile device. In an embodiment, a plurality of pre-defined accessibility patterns each of which correspond to one or more user interactions by a user with the mobile device are determined. Sensor data corresponding a set of one or more of the user interactions is received receiving, from one or more sensors of the mobile device, and a first pre-defined accessibility pattern that corresponds to the set of one or more of the user interactions received form the one or more sensors is identified. A modification to the user interface of the application based on the first pre-defined accessibility pattern is determined, wherein the modification to the user interface is configured to ease a difficulty associated with the first pre-defined accessibility pattern. The user interface is modified accordance with the modification.

19 Claims, 8 Drawing Sheets

(51) Int. Cl.
*G06F 3/0482* (2013.01)
*G06F 3/01* (2006.01)
*G06T 7/50* (2017.01)

(52) U.S. Cl.
CPC .............. *G06F 3/0482* (2013.01); *G06T 7/50* (2017.01); *G06F 2203/04803* (2013.01)

(58) Field of Classification Search
CPC .... G06F 1/1626; G06F 1/1686; G06F 1/1694; G06F 3/0304; G06F 3/04895; G06F 2203/04806; G06F 2207/10016; G06F 2207/30201; G06T 7/50
USPC .......................................................... 715/764
See application file for complete search history.

(56) References Cited

U.S. PATENT DOCUMENTS

| | | | |
|---|---|---|---|
| 8,515,491 B2 * | 8/2013 | Das | H04M 1/72481 455/566 |
| 9,218,410 B2 | 12/2015 | Gray et al. | |
| 9,423,939 B2 | 8/2016 | Schwesinger et al. | |
| 9,495,098 B2 | 11/2016 | Bellamy et al. | |
| 9,526,658 B2 | 12/2016 | Dialameh et al. | |
| 9,704,216 B1 | 7/2017 | Laskar et al. | |
| 9,911,104 B2 | 3/2018 | Magee et al. | |
| 9,918,203 B2 * | 3/2018 | Huang | G01S 5/0263 |
| 10,063,647 B2 | 8/2018 | Schneider et al. | |
| 10,261,589 B2 | 4/2019 | Sakai | |
| 2003/0195644 A1 | 10/2003 | Borders et al. | |
| 2004/0064530 A1 | 4/2004 | Sinclair et al. | |
| 2006/0117271 A1 * | 6/2006 | Keim | G06F 3/0489 715/826 |
| 2010/0188426 A1 * | 7/2010 | Ohmori | G06F 3/0481 345/660 |
| 2010/0251171 A1 | 9/2010 | Parulski | |
| 2011/0084897 A1 * | 4/2011 | Manoharan | G06F 1/1626 345/156 |
| 2012/0243735 A1 * | 9/2012 | Wu | A61B 3/032 345/660 |
| 2013/0033485 A1 * | 2/2013 | Kollin | G06F 3/0484 345/660 |
| 2013/0057573 A1 | 3/2013 | Chakravarthula et al. | |
| 2014/0137054 A1 | 5/2014 | Gandhi et al. | |
| 2014/0168274 A1 | 6/2014 | Wang et al. | |
| 2014/0283142 A1 | 9/2014 | Shepherd et al. | |
| 2015/0067560 A1 | 3/2015 | Cieplinski et al. | |
| 2015/0102995 A1 * | 4/2015 | Shen | G09G 5/00 345/156 |
| 2015/0242993 A1 * | 8/2015 | Raman | G06T 11/001 345/589 |
| 2015/0287043 A1 * | 10/2015 | Michaelis | G16H 50/20 705/317 |
| 2015/0294318 A1 | 10/2015 | Hui et al. | |
| 2017/0315849 A1 * | 11/2017 | Salas | G06F 9/451 |
| 2018/0063317 A1 | 3/2018 | Simpson et al. | |
| 2018/0089214 A1 * | 3/2018 | Broz | G06F 16/90324 |
| 2018/0262648 A1 | 9/2018 | Ravel et al. | |
| 2018/0338214 A1 | 11/2018 | Leuschner et al. | |
| 2020/0050330 A1 * | 2/2020 | Schilling | G06F 3/0488 |
| 2021/0055856 A1 | 2/2021 | Capurso et al. | |

OTHER PUBLICATIONS

Kornilova, Adaptive User Interface Patterns for Mobile Applications', School of Computer Science, ITA-Suomen Yliopisto, published 2014 (Year: 2014).*

* cited by examiner

DETECTING A PRE-DEFINED ACCESSIBILITY PATTERN TO MODIFY THE USER INTERFACE OF A MOBILE DEVICE

CROSS-REFERENCE TO RELATED APPLICATIONS

This application is a continuation of U.S. patent application Ser. No. 16/544,211, titled "Detecting Accessibility Patterns to Modify The User Interface of an Application" to Capurso et. al., filed on Aug. 19, 2019, which is herein incorporated by reference in its entirety.

BACKGROUND

Users may experience accessibility issues when interacting with applications on a mobile device. For example, font sizes may be too small and difficult to read. Further, some users may have difficulty manipulating or selecting buttons or icons on a graphical user interface of an application as displayed on the mobile device. Some users may attempt to alleviate these issues by setting default accessibility options on their mobile device. For example, an operating system of the device may include options such as a screen reader, visibility enhancements for text or color, hearing enhancements, or manipulation enhancements aiding with interactions.

While these techniques have been proposed to aid with accessibility, these techniques do not provide particular assistance to different applications on the mobile device. For example, different applications may require different techniques to aid in accessibility that are not addressed by the default settings provided by the mobile device. Further, some users may still require assistance despite not enabling an accessibility setting on the mobile device.

BRIEF SUMMARY

Disclosed herein are system, apparatus, device, method and/or computer program product embodiments, and/or combinations and sub-combinations thereof, for modifying a user interface of an application in response to detecting an accessibility pattern.

In an embodiment, a mobile device may detect a mobile device accessibility setting and/or sensor data to determine an accessibility pattern. The accessibility pattern may be one or more instances of data gathered from mobile device sensors indicating that the user is experiencing difficulty interacting with an application. Upon detecting the accessibility pattern, the application may modify a user interface such as a graphical user interface (GUI) in accordance with the detected accessibility pattern. This modification may be tailored to the particular application and/or the detected accessibility pattern to aid a user in interacting with the application.

In some embodiments, a computer-implemented method for modifying a graphical user interface (GUI) of an application may include recording data from a sensor of the mobile device to detect an accessibility pattern indicating that a user is experiencing difficulty interacting with the application due to an impairment of the user. In response to determining the accessibility pattern, a graphical user interface (GUI) of the application as displayed on the mobile device may be modified according to the detected accessibility pattern.

In some embodiments, a system for modifying a graphical user interface (GUI) of an application may comprise a memory device (including software and/or hardware) and at least one processor coupled to the memory device. The processor may be configured to The processor may record data from a sensor of the mobile device to detect an accessibility pattern indicating that a user is experiencing difficulty interacting with the application on the mobile device due to an impairment of the user. In response to detecting the accessibility pattern, the processor may modify a GUI of the application as displayed on the mobile device according to the detected accessibility pattern, wherein no accessibility setting of the mobile device has been set.

In some embodiments, a non-transitory computer-readable device is disclosed, the non-transitory computer-readable device may have instructions stored thereon that, when executed by at least one computing device, may cause the at least one computing device to perform operations including recording data from a sensor of the mobile device to detect an accessibility pattern indicating that a user is experiencing difficulty interacting with the application on the mobile device due to an impairment of the user. In response to detecting the accessibility pattern, a GUI of the application as displayed on the mobile device may be modified according to the detected accessibility pattern by enlarging a GUI data object displaying a real-time camera view.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Figure 1A:
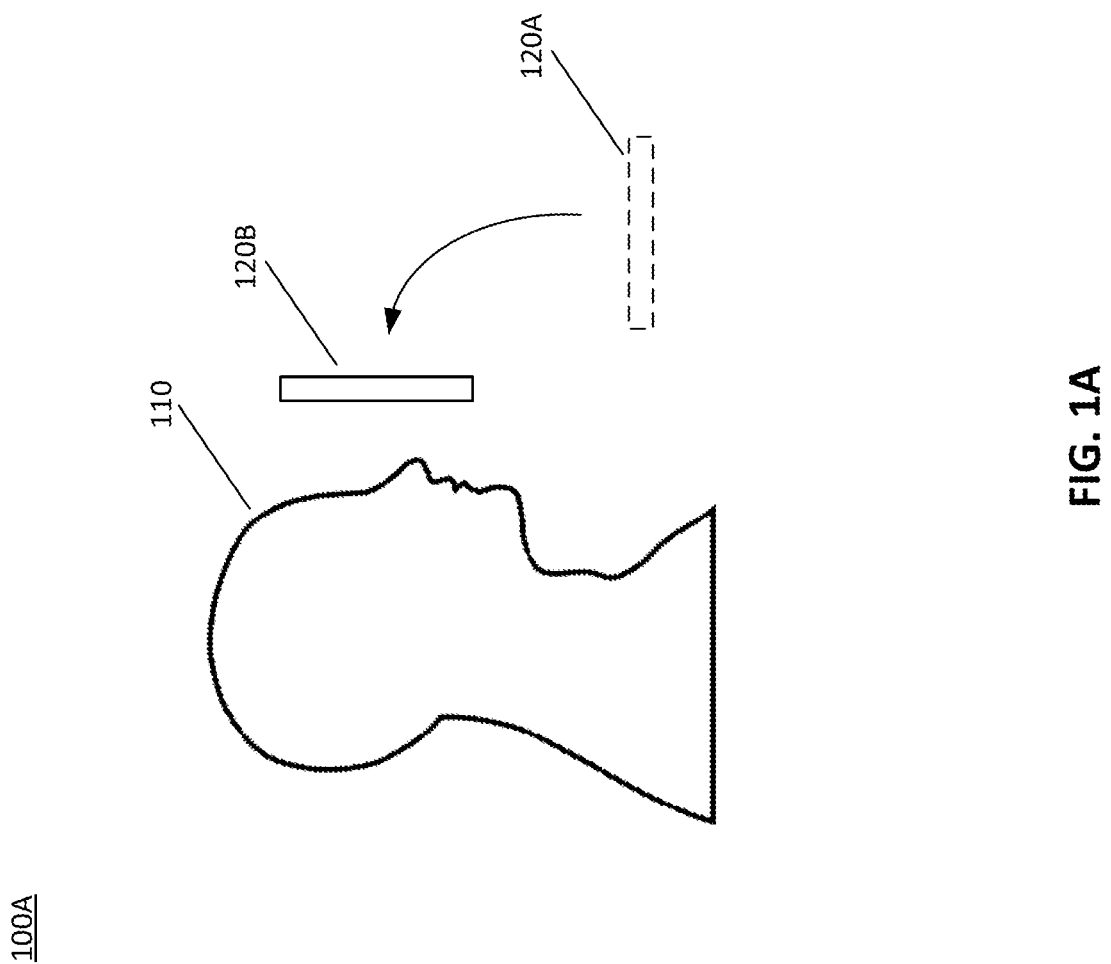
FIG. 1A depicts a block diagram of an action indicating a desire for accessibility assistance, according to some embodiments.

Provided herein are system, apparatus, device, method and/or computer program product embodiments, and/or combinations and sub-combinations thereof, for modifying a user interface of an application in response to detecting an accessibility pattern.

In an embodiment, an accessibility pattern may be pattern identified data collected from a device executing the application, such as, for example, a mobile device. The accessibility pattern may indicate that a user is experiencing difficult interacting with the application. The accessibility pattern may be due to an impairment of the user. For example, the text or images displayed on a graphical user interface (GUI) of the application may be difficult to read due to the user's impairment. Based on the user's manipulation of the mobile device, sensors of the mobile device may gather data and a processor of the mobile device may identify patterns of the data as representing an accessibility pattern.

Impairments related to vision, manual dexterity, cognition, age, and/or other physical disabilities may result in a user experiencing difficulty interacting with an application executing on a mobile device. For example, if a user is near-sighted, the user may experience difficulty reading text of the application. The user may bring the mobile device close to the user's eyes so that the user can better read the text. As the application executes on the processor of the mobile device, the application may detect data from sensors of the mobile device to identify this motion and categorize the motion as an identified accessibility pattern.

As will be further explained below, examples of sensors that can be used to identify an accessibility pattern may include a proximity sensor, one or more cameras, and/or an accelerometer. The proximity sensor may be a light or infrared sensor on the mobile device. In some embodiments, the proximity sensor may be the same sensor used to lock a display screen when a user attempts to make a phone call. The application may identify that the user is holding the mobile device close to the user's face based on a distance determined from the proximity sensor. Based on the data collected from the proximity sensor, the application may identify an accessibility pattern.

In some embodiments, the application may utilize one or more cameras of the mobile device. For example, the application may compare image data to identify a change in proximity of the mobile device to a user's face. The application may identify a facial feature in a front-facing camera and detect that the size of the face increases. This data may indicate that the user has moved the mobile device closer to the user's face and may represent an accessibility pattern. Similarly, a rear-facing camera may be used. The rear-facing camera may detect that object captured in an image becomes smaller. This change in image data may also indicate that the user is moving the camera toward the user's face and away from an external object.

Another sensor that may be used by the mobile device may be an accelerometer. The accelerometer may measure forces applied to the mobile device. Similar to the proximity sensor and/or the cameras, the accelerometer may measure a movement of the mobile device that may indicate an accessibility pattern, such as, for example determining that the mobile device is shaking. In some embodiments, the accelerometer may be a standalone sensor and/or may be combined with the proximity sensor and/or cameras to identify an accessibility pattern. The accelerometer may identify a movement of the mobile device such as bringing the mobile device closer to a user's face.

While the movement of the mobile device closer to a user's face has been discussed as an accessibility pattern, other types of accessibility patterns may be detected. For example, the data from the proximity sensor, cameras, and/or accelerometer may indicate that the user is unable to hold the mobile device steadily. For example, the mobile device may be shaking and/or may cause fluctuations in proximity, images, and/or accelerometer readings. This pattern may indicate that the user may be elderly and may also experience difficulties interacting with the application.

While sensors of the mobile device may detect different accessibility patterns based on the programming of the application and/or processor, the application and/or processor may also consider an accessibility setting of the device. For example, a user may have selected an option to display larger text for the application of the mobile device. The application and/or processor may identify this setting and/or identify the sensor data to define an accessibility pattern. For example, if the user has selected a setting, the application may not utilize the sensor data. In some embodiments, the application may use the sensor data to further enhance the setting selected by the user. In some embodiments, the application may identify the selected setting but may operate independently from the setting and modify a user interface according to the configuration of the application.

After identifying an accessibility pattern, the application and/or the processor executing the application may modify a user interface according to the accessibility pattern detected. For example, the application may modify a graphical user interface (GUI) of the application. In response to detecting an accessibility pattern indicating a visual impairment, the application may increase the size of the text of the GUI. In some embodiments, the application content displayed on the GUI may be altered to aid with accessibility. For example, a GUI displaying a list of items or input boxes may be altered depending on the detected accessibility pattern. For example, items on the list may be arranged or ordered differently depending on the accessibility pattern. Similarly, items may be added or removed from the list.

Content of a GUI may also be modified by splitting the content into multiple screens or separate GUIs. For example, upon detecting an accessibility pattern, the application may split a list of items into multiple GUI screens or slides. A user may interact with individual screens which may include larger font. This interaction may reduce confusion and be more helpful for a user as each screen may display less information. A user may navigate through each screen to interact with the application.

In some embodiments, the user interface may be modified by providing auditory feedback and/or accepting voice controls. For example, the application may trigger a screen reading process to generate audio data reading the contents of a screen. In some embodiments, the detection of an accessibility pattern may initiate a playing of an audio file that may be independent from the content displayed on a GUI. The audio file may be targeted to aid the user in interacting with the application. For example, the audio file may describe content displayed on a GUI beyond reading the text displayed on the GUI.

In an example embodiment, the GUI modification process may aid users attempting to capture an image using a mobile device. For example, the application may require verification or image capture and may request that a user supply information and/or capture an image of a government issued identification. The identification may be a document or a card. In attempting to supply user data and/or an image, the user may be presented with interactive icons, buttons, and/or a list of input boxes in a GUI requesting identification information. Based on the quantity of text and/or information requested, user that are visually impaired may face difficulty reading the text and/or interacting with the elements of the GUI. For example, the user may move the GUI closer the user's eyes to better read and/or view the information. Using the sensors of the mobile device and/or the accessibility settings, the application may detect an accessibility pattern and that the user is experiencing difficulties supplying the requested information.

In response to detecting the accessibility pattern, the application may modify the GUI to provide assistance. This modification may result from a configuration of the application, content of the currently displayed GUI, and/or the parameters detected to identify the accessibility pattern. For example, if a user is viewing text information, the text may be enlarged. If the user is attempting to capture an image, instead of having a box on the GUI represent the camera's view, the camera's view may be expanded to occupy a larger portion of the GUI. In some embodiments, the camera's view may be expanded to occupy the entire display screen. Similarly, rather than a manual capture, the application may switch to an automatic capture mode.

If a user is viewing a list of items providing options for verification, the application may determine that some options may be difficult to complete for users with impairments. The application may then modify the GUI to remove these options or reorder the list to highlight simpler options. In some embodiments, the application may modify a list of input forms and split the list into multiple GUI screens or slides. For example, rather than requesting a user name and a password in a single screen, the application may generate a first GUI requesting the user name. After the user has supplied the user name, the application may generate a second GUI requesting the password. In this manner, a user may more easily view and interact with the application.

In view of the described embodiments and as will be further described below, the disclosed modification of GUIs may aid users in viewing and/or interacting with a GUI. This modification may aid in more efficient data entry as well as image capture. In particular, fewer processing steps are wasted attempting to capture images of poor quality or analyzing incorrect data. For example, less computer processing may be needed to analyze this information, thus computing resources such as processing and memory may be used more effectively. The modification of the GUI may be directly correlated with the detected accessibility pattern through a machine learning or decision tree configuration. These configurations may allow for a fast modification of the GUI as displayed on a mobile device. In this manner, the described embodiments result in a faster data capture process.

Various embodiments of these features will now be discussed with respect to the corresponding figures.

FIG. 1A depicts a block diagram of an action 100A indicating a desire for accessibility assistance, according to some embodiments. User 110 may be interacting with a mobile device that may be executing an application. User 110 may be interacting with the mobile device at a first position 120A. As user 110 interacts with the mobile device and/or applications executing on the mobile device and displayed in a graphical user interface (GUI), user 110 may experience difficulties. For example, user 110 may experience a visual impairment and/or the text, buttons, icons, fillable forms, and/or other data objects may become difficult for the user to read and/or manipulate. For example, user 110 may have limited sight and/or may be elderly.

When user 110 experiences the difficulty, user 110 may perform action 100A by moving the mobile device from the first position 120A to a second position 120B. First position 120A may represent a position of the mobile device at a particular distance from user 110. Second position 120B may represent a position of the mobile device that is closer to the face or eyes of user 110 relative to first position 120A. For example, the user may be near-sighted and moving the mobile device via action 100A may be an attempt to better read the mobile device.

Action 100A may represent an accessibility pattern based on the sensor data captured by the mobile device. As will be further described with reference to FIG. 1B, data from one or more sensors of the mobile device may be gathered and analyzed to identify action 100A. This analysis may be performed via machine learning, artificial intelligence, and/or decision trees. In some embodiments, movement from first position 120A to second position 120B may indicate the accessibility pattern. In some embodiments, user 110 may move the mobile device back and forth between first position 120A and second position 120B, in an attempt to find an ocular focus to view the GUI. This type of motion may also represent an accessibility pattern. Similarly, the user 110 may squint and/or adjust their eyelids in an attempt to read the GUI. In this case, the application may also identify an accessibility pattern.

In some embodiments, user 110 may be far-sighted. User 110 may attempt to move the mobile device further away from the user's 110 face or eyes to better view the GUI. In these cases, the application may also identify an accessibility pattern and modify the GUI accordingly. In view of the nearsighted and farsighted examples, the application may modify the GUI in the same way and/or different ways. For example, the application may identify different accessibility patterns while enlarging text in response to the patterns.

Figure 1B:
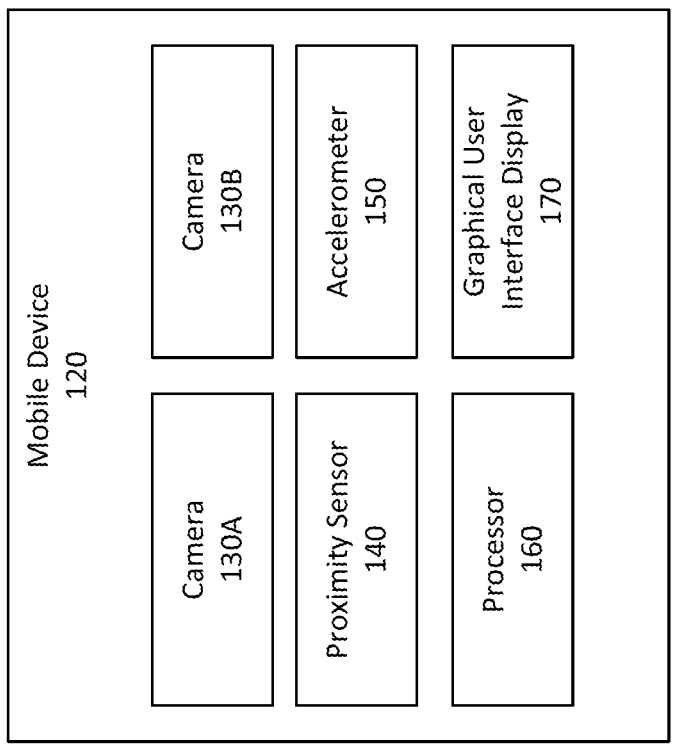
FIG. 1B depicts a block diagram of components of a mobile device, according to some embodiments.

FIG. 1B depicts a block diagram of components of a mobile device 120, according to some embodiments. Mobile device 120 may include one or more cameras 130, a proximity sensor 140, an accelerometer 150, a processor 160, and/or a graphical user interface (GUI) display 170. These components may aid in determining an accessibility pattern and/or modifying a GUI as displayed by an application executed by processor 160.

Camera 130A and camera 130B may be cameras located in different positions on mobile device 120. For example, camera 130A may be a front-facing camera pointing toward a user when a user is interacting with mobile device 120 and/or GUI display 170. Camera 130B may be a rear-facing camera, such as a camera used to capture images of objects at a distance. One or both of camera 130A and camera 130B may be used to determine an accessibility pattern. For example, camera 130A may be used to capture images of the user's face or eyes. If the user has brought mobile device 120 closer to the user's face or eye, images captured by camera 130A may indicate a change in face size. For example, multiple images may be captured and compared. If a pattern is detected that indicates that the user's face or eyes become larger, the user may be bringing mobile device 120 closer to their face. Processor 160 may identify this pattern using image recognition, facial recognition, and/or classification techniques.

Similarly, camera 130A may also monitor the eyes of a user. In some embodiments, a user may attempt to squint or blink if the user is experiencing difficulty viewing a GUI. In some embodiments, the dilation of the user's eyes may also be tracked. Camera 130A may capture images while processor 160 may be configured to identify these images and/or classify the eye patterns of the user. In response to detecting an accessibility pattern, processor 160 may modify the GUI accordingly.

Camera 130B may be used in conjunction with and/or independently from camera 130A to detect an accessibility pattern. Camera 130B may capture images of objects while processor 160 may process the images in a similar manner to processing images from camera 130A. For example, camera 130B may be pointed at an object such as a government identification card. The user may be attempting to capture an image of the card. Due to difficulties viewing the card through GUI display 170 on mobile device 120, the user may attempt to move mobile device 120 closer to the user's eyes. This action may cause camera 130B to move further away from the card and/or may result in an image where the card is smaller. Processor 160 may identify this action as an accessibility pattern.

Similarly, camera 130B may be pointed at an object at a further distance such as a tree or car while the user is attempting to interact with mobile device 120. As the user moves mobile device 120, the images of the tree and/or car may become larger or smaller. Processor 160 may identify these images and/or categorize them as an accessibility pattern. For example, when the user is interacting with an application, the user may be farsighted and move mobile device 120 further away from the user's face. In these cases, objects in the images may appear larger.

Proximity sensor 140 may also be used to identify an accessibility pattern.

Proximity sensor 140 may be a light or infrared (IR) sensor on mobile device 120. In some embodiments, proximity sensor 140 may be the same sensor used to lock a display screen when a user attempts to make a phone call by placing mobile device 120 next to the user's ear. The application may identify that the user is holding mobile device 120 close to the user's face based on a distance determined from proximity sensor 140.

Similar to the operation of camera 130A, proximity sensor 140 may be used to determine a distance of mobile device 120 from the user's face or eyes. For example, proximity sensor 140 may transmit a light and/or IR signal and measure a reflected signal from the user's face. An application executing on processor 160 may perform this transmission and measurement using proximity sensor 140. Upon receiving a reflected signal, processor 160 may determine a distance between mobile device 120 and a user's face. In some embodiments, proximity sensor 140 may not detect a reflected signal indicating that mobile device 120 is located at a far distance from the user's face.

Based on the measured distance from proximity sensor 140, processor 160 may determine an accessibility pattern. For example, as user moves mobile device 120 closer to the user's face in an attempt to better view GUI display 170, proximity sensor 140 may detect a shorter distance. Processor 160 may detect this short distance as an accessibility pattern. For example, if the distance measure falls below a threshold, an accessibility pattern may be detected. In some embodiments, processor 160 may measure the change in distance to detect an accessibility pattern. For example, if a user is moving the mobile device 120, the distance measured by proximity sensor 140 may decrease over time. Different measurements may be sampled to detect this decrease in distance. In response to the sampling, processor 160 may detect an accessibility pattern.

Similarly, another accessibility pattern may relate to the user moving mobile device 120 closer and then farther away from the user's face. The user may be attempting to find a desired distance for reading by varying the distance between mobile device 120 and the user's face. Processor 160 may sample these distance measurements, measure the variation of distance, and detect a corresponding accessibility pattern indicating that the user is attempting to find an optimal distance.

Accelerometer 150 may also be used to detect an accessibility pattern. For example, accelerometer 150 may detect that the user is unable to hold mobile device 120 steadily. The user may be elderly and may experience difficulty viewing the content of the application and/or interacting with the application. In response to the data gathered from accelerometer 150, processor 160 may detect an accessibility pattern. Similarly, processor 160 may detect an accessibility pattern based on interactions with GUI display 170. GUI display 170 may be a display screen of mobile device 120. GUI display 170 may be a touch-screen display. Similar to accelerometer 150, processor 160 may detect difficulties interacting with GUI display 170 as an accessibility pattern. For example, a user may experience difficulty pressing buttons or icons. Processor 160 may monitor these interactions with GUI display 170 and detect an accessibility pattern to provide assistance to the user.

While the examples described may trigger an accessibility pattern independent from other sensors, in some embodiments, processor 160 may identify an accessibility pattern based on a combination of data from sensors. For example, proximity sensor 140 may indicate that the user has moved mobile device 120 closer to the user's face. Camera 130A may also indicate the same motion via an analysis of the images captured by the front-facing camera 130A. In response to both of these conditions being met, processor 160 may identify an accessibility pattern. While multiple sensors need not be used to identify an accessibility pattern, using multiple sensors may provide processor 160 with redundancy so that false-positives are not triggered.

While processor 160 may interact with the sensors to detect an accessibility pattern, processor 160 may also execute an application and modify a GUI of the application in response to the detected accessibility pattern. In some embodiments, the application may supply commands to processor 160 to modify the GUI displayed on GUI display 170. In some embodiments, the type of modification may depend on the accessibility pattern detected. For example, if a user is near-sighted and/or moving mobile device 120 closer to the user's face, a particular modification to the GUI may be applied for near-sightedness, such as, for example, enlarging the text. Similarly, if a user is far-sighted, the text may also be enlarged or a different modification may be applied. In some embodiments, the corresponding modification may be pre-programmed by the application.

In some embodiments, machine learning and/or artificial intelligence may be used to determine a preferred modification. Processors 160 and/or the application executing on processor 160 may communicate with an external server to gather data and/or provide updates to determining a GUI modification. For example, test data presenting GUI modifications to users may be collected to determine effective GUI modifications. In some embodiments, this data may correlate a particular modification to a particular accessibility pattern or detected sensor pattern. Effectiveness of a particular GUI modification may be a measurement of time or attempts by a user to perform a task prescribed by the application.

For example, the task may be to capture an image of a government identification card or to supply information after reading a paragraph of text. If a user is experiencing difficulty, a GUI modification may be applied and the time to success and/or attempts to success may be measured. Initially, the type of GUI modification as well as the degree of a modification may be randomized and applied to the user applications. For example, icons and/or buttons may be rearranged and/or a paragraph of text may be divided into different portions to aid in gathering data related to effectiveness. This data may be gathered among multiple users to determine the effectiveness of a GUI modification. These GUI modifications may then be supplied to users in response to detecting particular accessibility patterns based on measured sensor patterns. Example embodiments of GUI modifications are further described with reference to FIGS. 3A-3C.

Figure 1C:
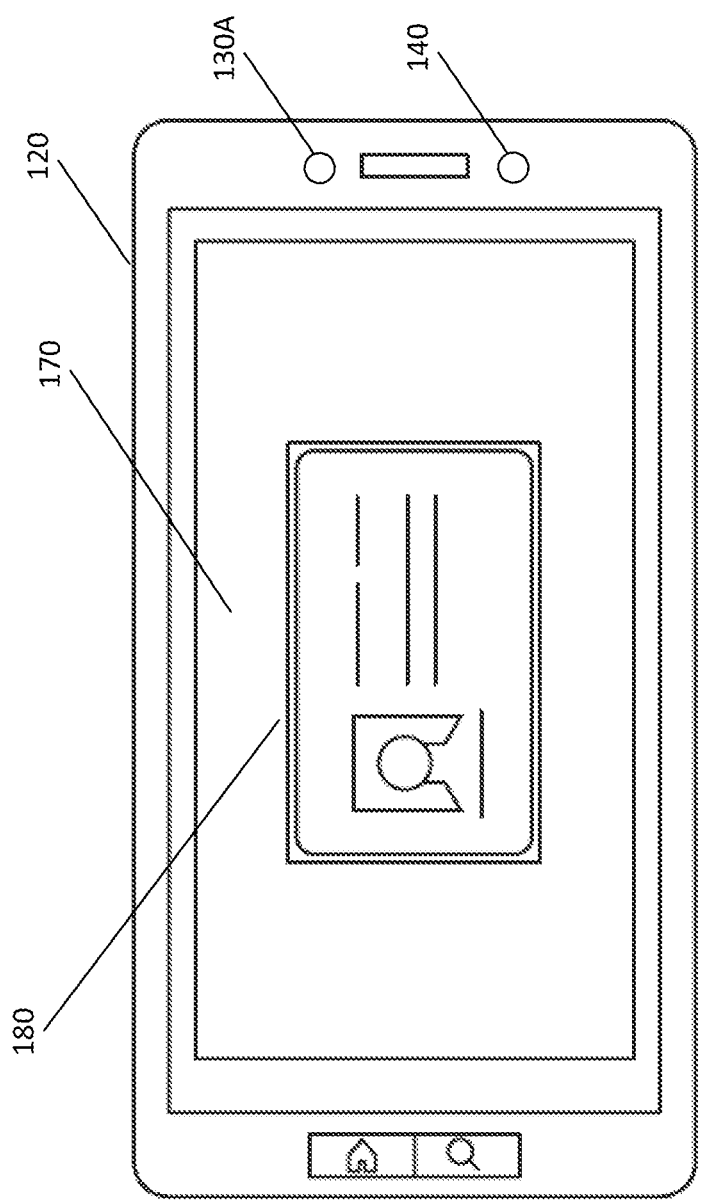
FIG. 1C depicts a block diagram of a graphical user interface (GUI) display on a mobile device, according to some embodiments.

FIG. 1C depicts a block diagram of a graphical user interface (GUI) display 170 on a mobile device 120, according to some embodiments. Mobile device 120 may be similar to mobile device 120 as described with reference to FIG. 1B. FIG. 1B depicts an embodiment of mobile device 120. Mobile device 120 may include a front-facing camera 130A and/or a proximity sensor 140. In some embodiments, front-facing camera 130A and/or proximity sensor 140 may reside on the same face of mobile device 120 as GUI display 170.

GUI display 170 may display text, images, videos, icons, buttons, fillable forms, lists, and/or other visual data objects generated by an application. Upon detecting an accessibility pattern via the sensors of mobile device 120, the application as executed on a processor of mobile device 120 may modify the data options displayed on GUI display 170.

In some embodiments, GUI display 170 may include a camera data object 180. Camera data object 180 may display images captured by a rear-facing camera on mobile device 120. GUI display 170 may display these images to aid a user in capturing an image with mobile device 120. In some embodiments, an application may request and/or prompt a user to capture an image via camera data object 180. The user may experience difficulty capturing the image by being unable to accurately view the image in camera data object 180 and/or align the object to be captured. The object to be captured may be, for example, a government identification.

As previously described, sensors or a processor of mobile device 120 may detect an accessibility pattern. For example, the accessibility pattern may be detected in response to a user accessing the application and/or accessing a portion of the application prompting the user to capture an image. The application may display camera data object 180 on GUI display 170 during a first state of the application. Upon detection of the accessibility pattern, the application may modify GUI display 170 to enlarge camera data object 180 to aid the user in capturing the image. This process may enlarge camera data object 180 to display a larger real-time camera view. For example, a larger portion of GUI display 170 may display camera data object 180. This enlarging of camera data object 180 may be a modification of the GUI.

As previously explained, this GUI modification may be specific to and/or controlled by the application. The application may control this modification rather than a default setting of mobile device 120. Further mobile device 120 may be incapable of detecting this type of modification. In this manner, the embodiments described are able to tailor specific GUI modifications to specific applications and/or application interactions.

Figure 2:
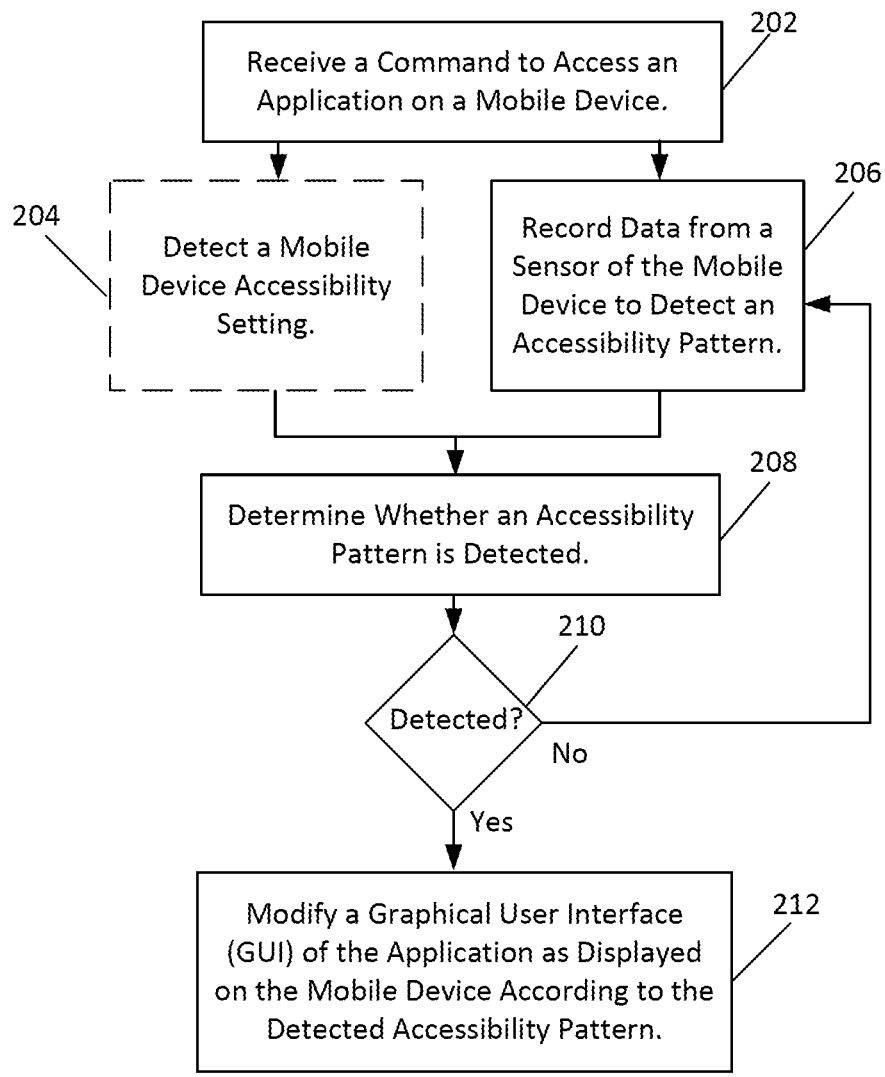
FIG. 2 depicts a flow diagram illustrating a method for modifying a graphical user interface (GUI) of an application according a detected accessibility pattern, according to some embodiments.

FIG. 2 depicts a flow diagram illustrating a method 200 for modifying a graphical user interface (GUI) of an application according a detected accessibility pattern, according to some embodiments. Method 200 shall be described with reference to FIG. 1B; however, method 200 is not limited to that example embodiment.

In some embodiments, processor 160 of mobile device 120 may utilize method 200 to modify a GUI displayed on GUI display 170 in response to detecting an accessibility pattern. While method 200 is described with reference to mobile device 120, method 200 may be executed on any computing device, such as, for example, the computer system described with reference to FIG. 4 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2, as will be understood by a person of ordinary skill in the art.

At 202, processor 160 of mobile device 120 may receive a command to access an application. A user may interact with mobile device 120 via GUI display 170 and select a particular application. Upon receiving the selection, mobile device 120 may retrieve software elements from memory and/or download application data from an external computer or server. Processor 160 may then execute the application and generate GUI data object visualized on GUI display 170.

At 204, processor 160 may detect a mobile device accessibility setting. At 206, processor 160 may record data from a sensor of mobile device 120 to detect an accessibility pattern. Using the mobile device accessibility setting and/or the recorded data, processor 160 may determine whether an accessibility pattern is detected at 208. In some embodiments, user profile information may also be retrieved to aid in determining an accessibility pattern.

The mobile device's accessibility setting may be a setting of the operating system. Using a mobile device's accessibility setting to detect an accessibility pattern may be optional. In some embodiments, however, the accessibility setting may be used in conjunction with the recorded sensor data to determine an accessibility pattern. For example, an accessibility setting may indicate that applications of the mobile device 120 are to display text with a larger font size. The application, as executed by processor 160, may use this information and adjust the font size accordingly. In some embodiments, this accessibility setting may result in a first modification to a GUI while recorded data may cause further or additional modifications based on the detected accessibility pattern. In some embodiments, processor 160 may determine that an accessibility setting of mobile device 120 has not been set. Processor 160 may still apply GUI modifications in response to detecting an accessibility pattern even if no default accessibility setting has been set.

At 206, data may be recorded from sensors of the mobile device 120 such as camera 130A, camera 130B, proximity sensor 140, accelerometer 150, and/or GUI display 170. Upon recording data, processor 160 may analyze the data gathered from the one or more sensors at 208 to determine whether an accessibility pattern is detected. The types of sensor data gathered as well as the different accessibility patterns were previously discussed with reference to FIG. 1B Processor 160 may be pre-configured to detect an accessibility pattern from the pattern identified from the sensors. When the application is updated, processor 160 may also update the patterns and/or conditions used to detect an accessibility pattern.

At 210, processor 160 may determine whether to proceed due to detecting an accessibility pattern or return to 206 to continue monitoring recorded data from the one or more sensors. If an accessibility pattern is not detected, processor 160 may continue to record data until an accessibility pattern is detected. In some embodiments, a user may complete a task or finish interacting with the application without detection of an accessibility pattern.

If an accessibility pattern is detected, however, processor 160 may modify a GUI of the application as displayed on mobile device 120 according to the detected accessibility condition at 212. In some embodiments, the modification of the GUI may be performed according to the accessibility pattern and/or underlying data recorded. For example, if processor 160 detects an accessibility pattern based on data recorded from proximity sensor 140 and/or camera 130A, processor 160 may perform a particular modification corresponding to the accessibility pattern, such as, for example, enlarging text.

In some embodiments, processor 160 may detect an accessibility pattern from other sensors, such as accelerometer 150 or GUI display 170. Accelerometer 150 may detect that a user is not holding mobile device 120 steadily and/or that mobile device 120 is shaking. Processor 160 may also detect that the user is experiencing difficulty interacting with GUI display 170. In response to one or more of these accessibility patterns, a different GUI modification may be applied, such as, for example, rearranging data objects depicted in GUI display 170 and/or splitting the content into multiple GUI screens. This accessibility may modify the content of the application to aid the user in interacting with the application beyond enlarging text. In this manner, the GUI may be modified in response to the accessibility pattern detected. Example GUI modifications are further described with reference to FIGS. 3A-3C.

In some embodiments, the mapping of a particular GUI modification to a particular accessibility pattern may be pre-configured by the application as executed on processor 160. In some embodiments and as previously described, the mapping of a particular GUI modification to a particular accessibility pattern may be determined using machine learning and/or artificial intelligence. For example, the test data may be collected from multiple instances of the application executing on multiple mobile devices 120. Different GUI modifications may be recommended based on different accessibility patterns detected. The application may determine the efficacy of the GUI modification based on how quickly the user completes a task or operation on the application and/or the number of interactions used to complete the operation. Based on this gathered information, GUI modifications may be mapped using the machine learning to minimize the amount of time or interactions that elapse prior to a user completing an interaction. Upon detecting a subsequent accessibility pattern, the particularly mapped GUI modification may be executed.

Figure 3A:
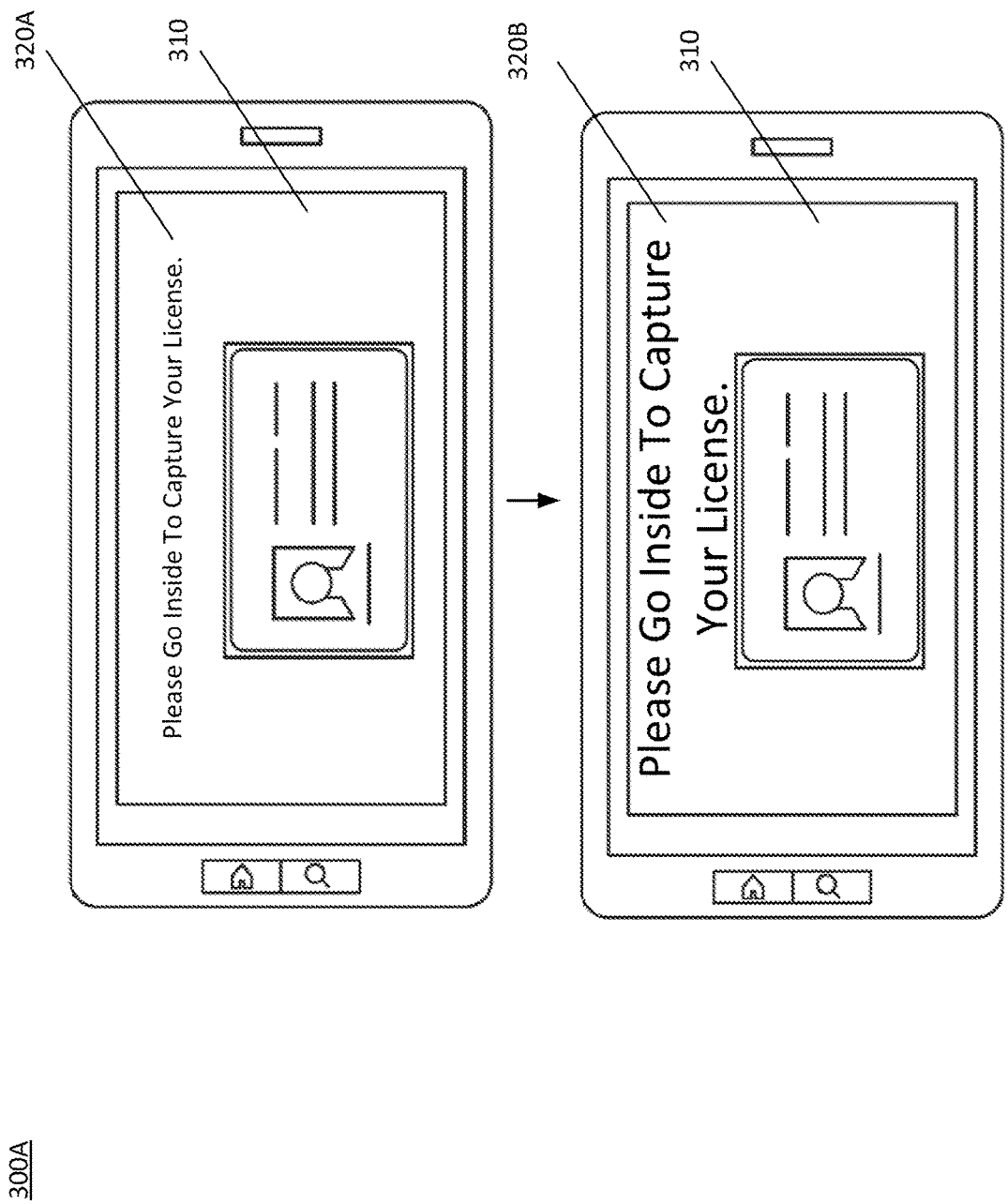
FIG. 3A depicts a block diagram of a GUI modification process displaying enlarged text within an application, according to some embodiments.

FIG. 3A depicts a block diagram of a GUI modification process 300A displaying enlarged text within an application, according to some embodiments. A mobile device may include a GUI display 310 with a text data object 320A. For example, text data object 320A may be application content, a message prompt, instructions, icons, buttons, and/or other text generated by the application. In an example embodiment, the text data object 320A may be an instruction for capturing an image of a government identification that states "Please Go Inside To Capture Your License."

In response to detecting an accessibility pattern, a processor of the mobile device may execute GUI modification process 300A to enlarge text data object 320A to display a larger version of the text as text data object 320B. While the content of the text may be the same, the size may be increased to aid a user experiencing difficulties with interacting with the application. In some embodiments, GUI modification process 300A may also be applied to images. After detecting an accessibility pattern, the processor may enlarge different types of data objects, such as images, windows, graphics, and/or other visual data to assist the user.

Figure 3B:
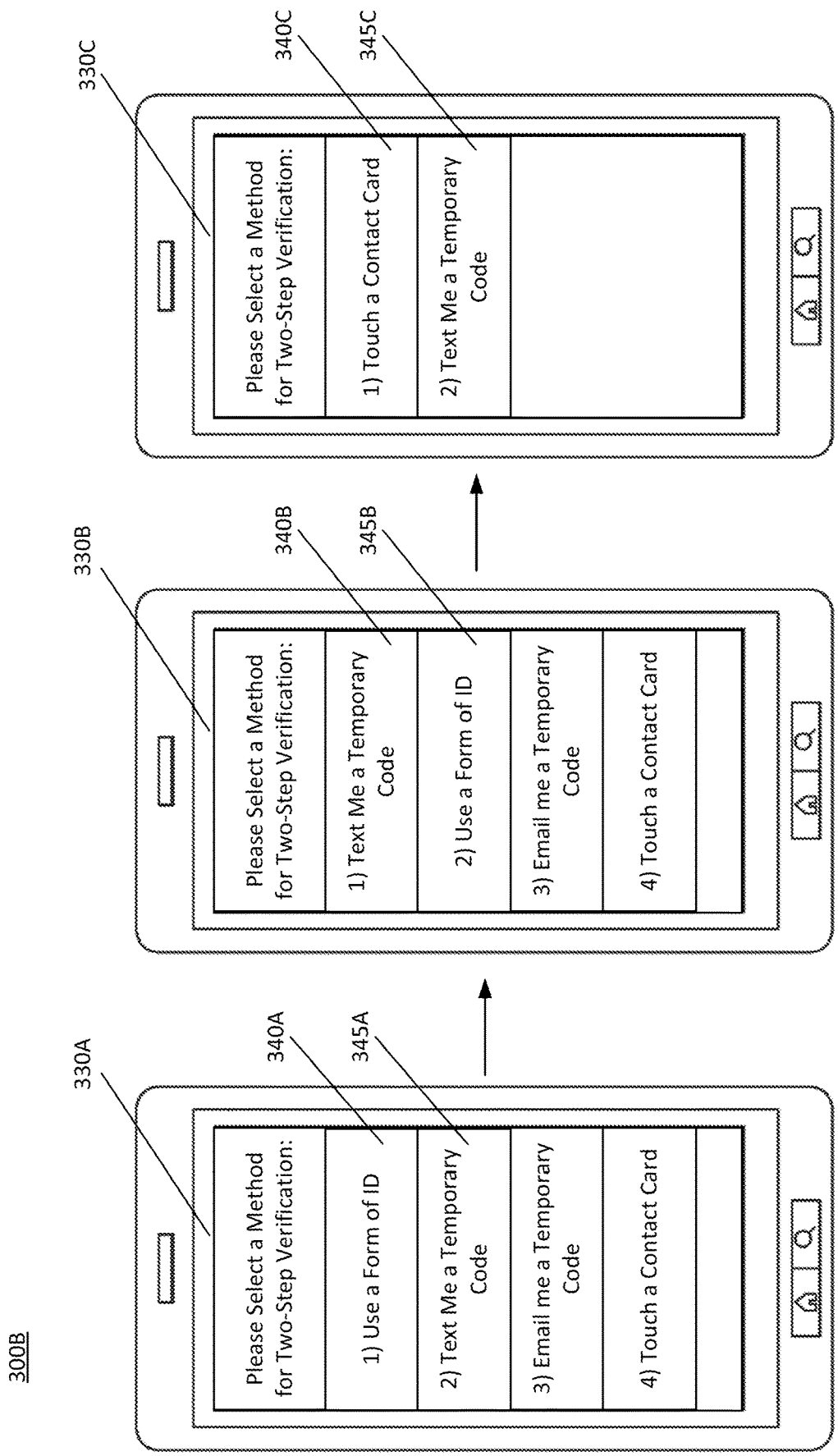
FIG. 3B depicts a block diagram of a GUI modification process displaying list modifications, according to some embodiments.

FIG. 3B depicts a block diagram of a GUI modification process 300B displaying list 330 modifications, according to some embodiments. As the application executes, the application may display a list 330A. List 330A may include data objects 340A, 345A. Data objects 340A, 345A may be interactive icons and/or buttons used to interact with the application. While FIG. 3B displays the arrangement of data objects 340A, 345A in a list format, the data objects may be arranged in other formats such as a grid or free-form floating icons viewable with the GUI. In an example embodiment, data objects 340A, 345A may be selectable options to proceed with a "two-step verification." For example, when selected, data object 340A may allow a user to capture an image of an identification. When data object 345A is selected, the application may be command to send a text message requesting that a temporary be transmitted to the mobile device. List 330A may include other data objects and may represent different commands available for interacting with the application.

Upon detecting an accessibility pattern, a processor of the mobile device may modify the GUI and alter list 330A. This modification may cause the GUI to display list 330B. List 330B may alter the location of data objects as seen from data objects 340B, 345B. For example, the option to capture an image may be listed second as data object 345B while the option to request a text message may be listed first as data object 340B. This GUI modification may be performed based on an accessibility pattern detected by the processor of the mobile device. For example, the processor may determine that the user is unable to steadily hold the mobile device from accelerometer data and/or camera data. In this case, the user may experience difficulty capturing an image. The processor may then modify the GUI to highlight an option that may be easier for the user to perform the verification.

In some embodiments, a GUI displaying list 330A or list 330B may be altered to display list 330C. List 330C may remove data objects, rearrange, and/or reorder the location of data objects in response to a detected accessibility pattern. For example, if a user is detected as having difficulty navigating the application, some data objects may be removed leaving data objects 340C, 345C as the options available for selection. For example, to complete a verification process, data object 340C may highlight touching a contact card that may operate using near-field communications to perform a verification. In some embodiments, other hardware authentication devices may be recommended, such as hardware tokens and/or devices implementing a FIDO protocol. Some options, such as capturing an image may be removed as potentially being too difficult for a user to perform. For example, a user may register failed attempts at interacting with the application and/or may be unable to steadily hold the mobile device. In this case, the detected accessibility pattern may indicate that the user may not be capable of capturing an image. The GUI modification may then remove this option.

As previously explained, the GUI modification may rearrange and/or reorder data objects that may appear on a list 330 and/or that may be free-form. Similarly, some data objects may be removed or hidden. In some embodiments, other visual distinctions may be performed to identify a data object such as colors, highlighting, or enlarging text.

Figure 3C:
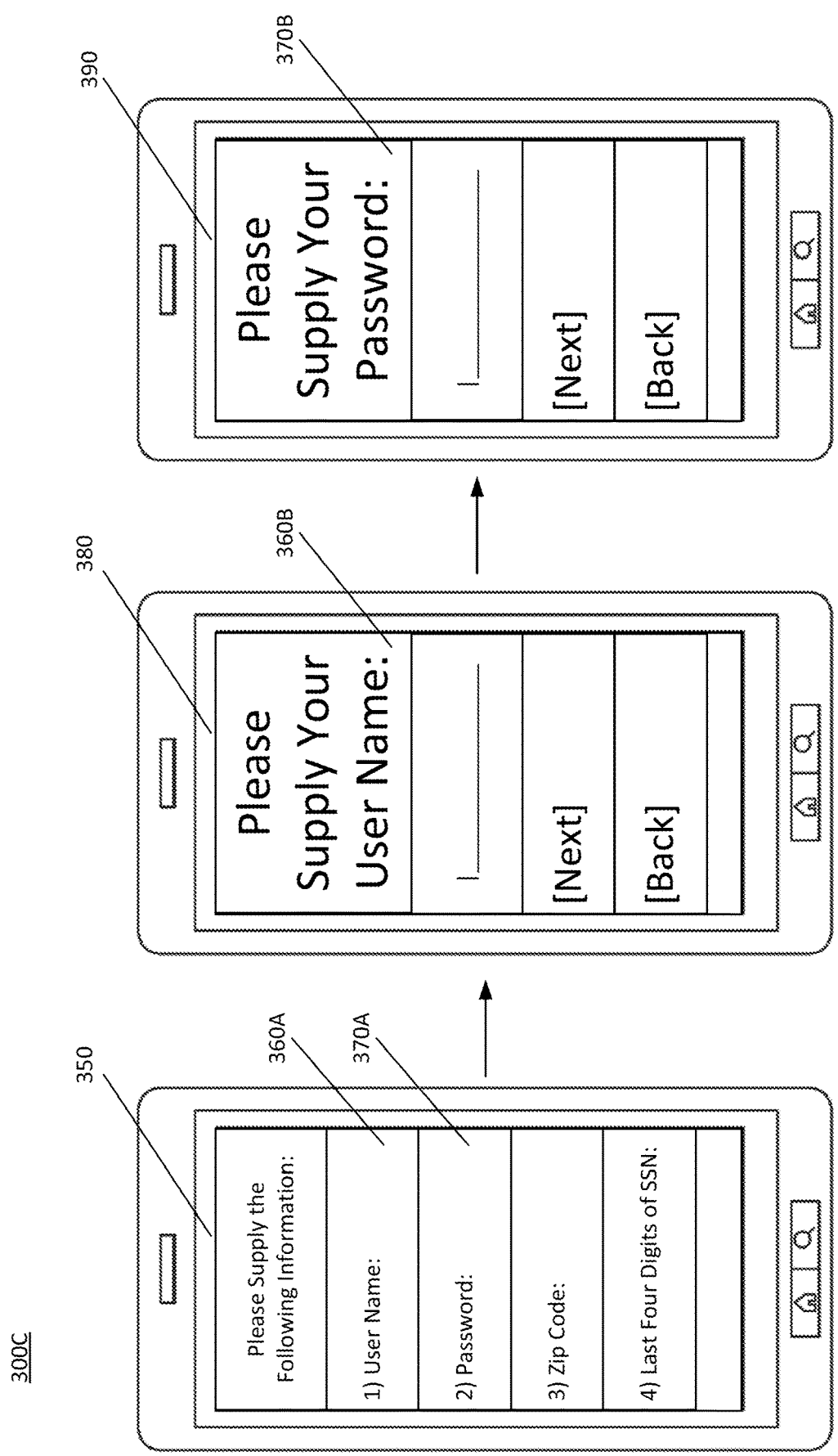
FIG. 3C depicts a block diagram of a GUI modification process displaying a slide-based modification, according to some embodiments.

FIG. 3C depicts a block diagram of a GUI modification process 300C displaying a slide-based modification, according to some embodiments. GUI modification process 300C may rearrange content of an application to aid a user in completing a process. In some embodiments, portions of a GUI may be displayed so that a user is not overwhelmed or unable to view and/or interact with data objects on the GUI. This modification may modify data objects into different "slides" representing portions of the GUI.

For example, a GUI may be divided into a first portion and a second portion. A second GUI may be generated display the first portion such that the second GUI occupies the display area. A third GUI may then be generated displaying the second portion of the GUI. This third GUI may replace the second GUI such that the third GUI occupies the display area. In an embodiment, this process may be referred to as "slides" and will be further discussed with reference to list 350 and data objects 360A, 370A as depicted in FIG. 3C.

In some embodiments, an application executing on the mobile device may display a list 350 of data objects 360A, 370A. The data objects 360A, 370A may be forms used by the user to supply information to the application. For example, the application may request identification information such as a username, password, zip code, and/or the last four digits of a social security number. The data objects 360A, 370A may allow users to enter this information while interacting with list 350.

Upon detecting an accessibility pattern, however, the application as executed on a processor of the mobile device may identify that the user is experiencing difficulty interacting with the data objects 360A, 370A and/or supplying information. In this case, a slide-based modification may be applied to list 350. Instead of display list 350, the GUI may display portions of list 350 so that less text occupies the GUI and/or so that fewer data objects are visible to avoid overwhelming a user.

For example, GUI modification may generate slide 380. Slide 380 may be a GUI display representing data object 360A as a slide data object 360B. Slide data object 360B may be an enlarged version of data object 360A and/or may occupy more space on a display screen of the mobile device. Similarly, the text of slide data object 360B may be enlarged to aid a user in viewing the text. Other interactive icons and/or buttons may also be provided to aid with navigation to view other data objects. In some embodiments, slide data object 360B may request that a user supply a username. Upon receipt of the username, slide 380 may advance to slide 390.

Slide 390 may be a GUI display representing data object 370A as a slide data object 370B. Similar to slide data object 360B, slide data object 370B may represent an enlarged version of data object 370A. In some embodiments, the user may be requested to supply a password using slide data object 370B. Upon completion, the user may continue to interact with subsequent slides so that the application may receive the requested information. These GUI modifications in response to detecting an accessibility pattern may aid a user in interacting with the application. Further, this modification may reduce the number of failed attempts to supply information leading to an increase in data processing speeds.

In view of the modifications described with reference to FIGS. 3A-3C, the application may modify GUI screens to adjust an application experience for a user. Certain data objects may be adjusted to avoid distractions and to aid with completion of a task. These GUI modifications may be applied to many varieties of different applications performing different tasks.

While FIGS. 3A-3C have described user interface modifications to a GUI, other user interface modifications may also be performed such as auditory modifications. In some embodiments, a screen reader may be employed and/or another audio file may be played to aid the user. For example, the screen reader may read the content of data objects. The audio aids may be played independently from the GUI modification and/or in conjunction with the GUI modifications. In some embodiments, upon detecting an accessibility pattern, the application may play an audio file that provides further instructions beyond reading the text on the screen. For example, the audio file may explain that the process will be divided into slides. In some embodiments, if a user is experiencing difficulty interacting with the application, a microphone of the mobile device may be activated allowing a user to navigate the application with voice commands.

Figure 4:
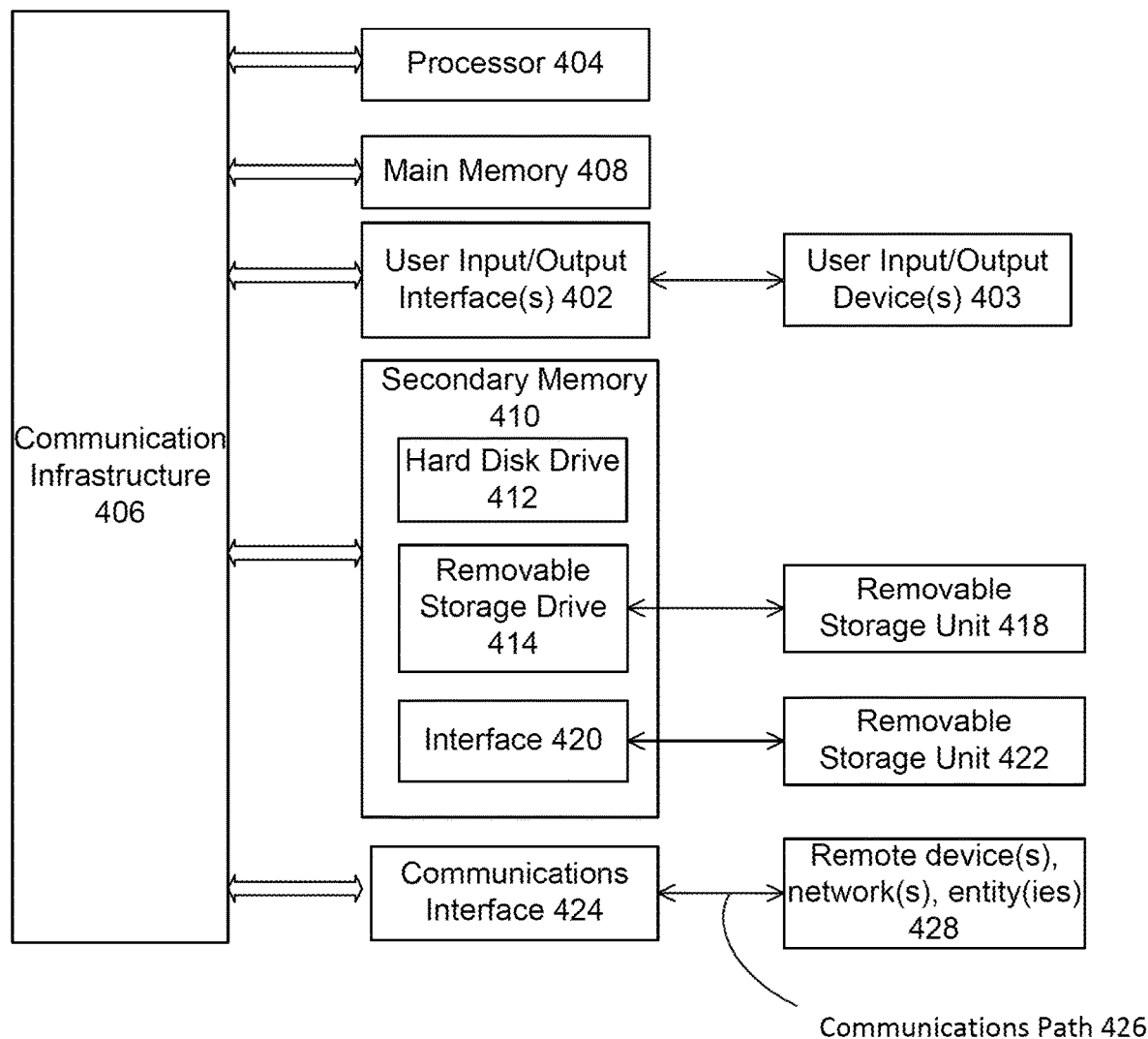
FIG. 4 depicts an example computer system useful for implementing various embodiments.

FIG. 4 depicts an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
determining a plurality of pre-defined accessibility patterns each of which correspond to one or more user interactions by a user with a mobile device, wherein each of the plurality of pre-defined accessibility patterns correspond to a motion of the mobile device detected by one or more sensors;
receiving, from the one or more sensors of the mobile device, sensor data corresponding to a set of one or more user interactions, including an indication that a distance between the user and the mobile device has decreased;
identifying a first pre-defined accessibility pattern of the plurality of pre-defined accessibility patterns that corresponds to the indication that the distance between the user and the mobile device has decreased;
determining a modification to a user interface of an application based on the indication that the distance between the user and the mobile device has decreased in accordance with the first pre-defined accessibility pattern, wherein the modification to the user interface comprises removing an item from the user interface of the application;
modifying the user interface of the application in accordance with the determined modification corresponding to the first pre-defined accessibility pattern.

2. The computer-implemented method of claim 1, wherein the removing comprises:
determining that the user has failed to perform a task associated with the item.

3. The computer-implemented method of claim 1, wherein the determining the modification comprises:
identifying a plurality of items displayed on the user interface of the application;
dividing the plurality of items into multiple screens of the user interface, including both a first screen comprising a first set of the plurality of items and a second screen comprising a second set of the plurality of items.

4. The computer-implemented method of claim 2, further comprising:
displaying only the first screen comprising the first set of the plurality of items on the mobile device.

5. The computer-implemented method of claim 3, further comprising:
receiving a user input responsive to one of the first set of the plurality of items displayed on the first screen; and
displaying the second screen comprising the second set of the plurality of items on the mobile device responsive to receiving the user input.

6. The computer-implemented method of claim 1, wherein the modification comprises rearranging a plurality of items on the user interface of the application.

7. The computer-implemented method of claim 1, wherein the modification includes increasing a size of text displayed on the user interface.

8. The computer-implemented method of claim 1, wherein the modification includes playing audio describing content displayed on the user interface.

9. A system, comprising:
a memory; and
at least one processor coupled to the memory and configured to perform operations comprising:
determining a plurality of pre-defined accessibility patterns each of which correspond to one or more user interactions by a user with a mobile device, wherein each of the plurality of pre-defined accessibility patterns correspond to a motion of the mobile device detected by one or more sensors;
receiving, from the one or more sensors of the mobile device, sensor data corresponding to a set of one or more user interactions, including an indication that a distance between the user and the mobile device has decreased;
identifying a first pre-defined accessibility pattern of the plurality of pre-defined accessibility patterns that corresponds to the indication that the distance between the user and the mobile device has decreased;
determining a modification to a user interface of an application based on the indication that the distance between the user and the mobile device has decreased in accordance with the first pre-defined accessibility pattern, wherein the modification to the user interface comprises removing an item from the user interface of the application;
modifying the user interface of the application in accordance with the determined modification corresponding to the first pre-defined accessibility pattern.

10. The system of claim 9, wherein the removing comprises:
determining that the user has failed to perform a task associated with the item.

11. The system of claim 9, wherein the determining the modification comprises:
identifying a plurality of items displayed on the user interface of the application;
dividing the plurality of items into multiple screens of the user interface, including both a first screen comprising a first set of the plurality of items and a second screen comprising a second set of the plurality of items.

12. The system of claim 11, the operations further comprising:
displaying only the first screen comprising the first set of the plurality of items on the mobile device.

13. The system of claim 12, the operations further comprising:
receiving a user input responsive to one of the first set of the plurality of items displayed on the first screen; and
displaying the second screen comprising the second set of the plurality of items on the mobile device responsive to receiving the user input.

14. The system of claim 9, wherein the modification comprises rearranging a plurality of items on the user interface of the application.

15. A non-transitory computer-readable medium having instructions stored thereon that, when executed by at least one computing device, cause the at least one computing device to perform operations comprising:
determining a plurality of pre-defined accessibility patterns each of which correspond to one or more user interactions by a user with a mobile device, wherein each of the plurality of pre-defined accessibility patterns correspond to a motion of the mobile device detected by one or more sensors;
receiving, from the one or more sensors of the mobile device, sensor data corresponding to a set of one or more user interactions, including an indication that a distance between the user and the mobile device has decreased;
identifying a first pre-defined accessibility pattern of the plurality of pre-defined accessibility patterns that corresponds to the indication that the distance between the user and the mobile device has decreased;
determining a modification to a user interface of an application based on the indication that the distance between the user and the mobile device has decreased in accordance with the first pre-defined accessibility pattern, wherein the modification to the user interface comprises removing an item from the user interface of the application;
modifying the user interface of the application in accordance with the determined modification corresponding to the first pre-defined accessibility pattern.

16. The non-transitory computer-readable medium of claim 15, wherein the removing comprises:
determining that the user has failed to perform a task associated with the item.

17. The non-transitory computer-readable medium of claim 15, wherein the determining the modification comprises:
identifying a plurality of items displayed on the user interface of the application;
dividing the plurality of items into multiple screens of the user interface, including both a first screen comprising a first set of the plurality of items and a second screen comprising a second set of the plurality of items.

18. The non-transitory computer-readable medium of claim 17, the operations further comprising:
displaying only the first screen comprising the first set of the plurality of items on the mobile device.

19. The non-transitory computer-readable medium of claim 18, the operations further comprising:
    receiving a user input responsive to one of the first set of the plurality of items displayed on the first screen; and
    displaying the second screen comprising the second set of the plurality of items on the mobile device responsive to receiving the user input.

\* \* \* \* \*